United States Patent
Gill et al.

(10) Patent No.: US 8,909,890 B2
(45) Date of Patent: Dec. 9, 2014

(54) SCALABLE PERFORMANCE-BASED VOLUME ALLOCATION FOR TIME-BASED STORAGE ACCESS SERVICES

(75) Inventors: Binny S. Gill, Auburn, MA (US); Madhukar R. Korupolu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 12/709,742

(22) Filed: Feb. 22, 2010

(65) Prior Publication Data
US 2011/0208941 A1    Aug. 25, 2011

(51) Int. Cl.
*G06F 3/00* (2006.01)
*G06F 3/06* (2006.01)
*G06F 9/50* (2006.01)

(52) U.S. Cl.
CPC ........... *G06F 3/0605* (2013.01); *G06F 3/06* (2013.01); *G06F 3/0631* (2013.01); *G06F 9/50* (2013.01); *G06F 3/0689* (2013.01)
USPC .......................................................... 711/170

(58) Field of Classification Search
USPC .......................................................... 711/170
See application file for complete search history.

(56) References Cited

U.S. PATENT DOCUMENTS

| | | | |
|---|---|---|---|
| 6,247,077 B1 | 6/2001 | Muller et al. | |
| 2002/0138691 A1 | 9/2002 | Yamamoto et al. | |
| 2005/0055370 A1 | 3/2005 | Fukuda et al. | |
| 2006/0136684 A1 | 6/2006 | Le et al. | |
| 2006/0200400 A1 | 9/2006 | Hunter et al. | |
| 2007/0283360 A1 | 12/2007 | Koretz et al. | |
| 2008/0288739 A1* | 11/2008 | Bamba et al. | 711/172 |

* cited by examiner

*Primary Examiner* — Matthew Bradley
*Assistant Examiner* — Craig Goldschmidt
(74) *Attorney, Agent, or Firm* — Lieberman & Brandsdorfer, LLC

(57) ABSTRACT

A scalable, performance-based, volume allocation technique that can be applied in large storage controller collections is disclosed. A global resource tree of multiple nodes representing interconnected components of a storage system is analyzed to yield gap values for each node for a specific time period. The gap value for each node is an estimate of the amount of the additional or increased workload that can be allocated in the subtree of that node without exceeding the performance and space bounds at any of the nodes in that subtree for the specific time period. The gap values of the global resource tree are further analyzed to generate an ordered allocation list of the volumes of the storage system.

20 Claims, 7 Drawing Sheets

SCALABLE PERFORMANCE-BASED VOLUME ALLOCATION FOR TIME-BASED STORAGE ACCESS SERVICES

BACKGROUND

1. Field of the Invention

This invention relates to large computer storage controller collections. More specifically, this invention relates to performance-based volume allocation in a storage controller collection with respect to time sensitive storage access services.

2. Background

Performance-based volume allocation in a storage system is the task of determining where to allocate volumes for a workload based on the workload profile in terms of space and performance requirements and the current performance numbers at the various components of the storage controllers in the system. This task becomes more challenging as the storage sizes increase, the number of disks per controller increases, and the number of controllers in the system increases. Current single controller algorithms do not scale well with the increasing sizes and hence are not suitable for large dynamic storage control scenarios. Furthermore, conventional controller algorithms introduce large variances among system components.

Current storage controllers are sophisticated devices which can be modeled as a hierarchy of components where each component has its performance constraints. By modeling the storage controller as a hierarchy of components, i.e. a resource graph model, dependencies between the hardware components in a storage controller may be captured. In one embodiment, each of the components in the resource graph model is referred to as a node. The current space and performance numbers for each component are obtained to ensure that no component in the hierarchy is overloaded. Overloading of a single component in the hierarchy can disrupt workloads assigned to the storage pools associated with the component. Workload profiles for new workloads may be used to predict the space and performance requirements for new workloads. Other factors such as minimum and maximum permissible or required logical volume sizes can also impact the workload assignment decision making process. The existing performance numbers along with the workload profiles and other factors mentioned above may be taken into account to determine suitable storage controller components for creating volumes for allocating the new workloads.

Conventional algorithms for storage volume allocation introduce a large variance among system components, leading to heavy loads on some components in the storage controller resource hierarchy. Greedy or random assignment algorithms lead to poor allocations resulting in unbalanced systems as they fail to consider load balancing for system components higher in the hierarchy of the resource graph. As system components, i.e. nodes, higher in the resource graph hierarchy are responsible for larger number of workloads compared to system components lower in the hierarchy, any overloading of these components can lead to poor overall system performance. Some systems and methods have been developed in the area of storage control and resource allocation.

There is a need in the art for programs, methods and systems to allocate storage volumes in a distributed storage system with improved performance. Further, there is a need for such programs, methods, and systems to employ an algorithm for allocating volumes in large storage controller collections that is scalable and performance-based. Such needs should address load on system components in the storage hierarchy during specific periods of time. These and other needs are met by the present invention as detailed hereafter.

BRIEF SUMMARY

Embodiments of the invention are derived from a scalable, performance-based, volume allocation technique that can be applied in large storage controller collections. Embodiments of the invention can be based on a combination of a bottom-up estimation process and a top-down selection process while maintaining correctness yielding a balanced load on all components of the system (at different hierarchical levels) during volume allocation. Thus, the algorithm ensures proper allocation of system components based upon time sensitive services. A global resource tree of multiple nodes representing interconnected components of a storage system is analyzed to yield gap values for each node. The gap value for each node corresponds to a throughput limit for a non-leaf node or a capacity limit for a leaf node during a specified time interval (T1, T2). The gap value for each node can comprise an estimate of the amount in GB of the new workload that can be allocated in the subtree of that node during that specified time interval without exceeding the performance and space bounds at any of the nodes in that subtree. The gap values of the global resource tree are further analyzed to generate an ordered allocation list of the volumes of the storage system. The volumes may be allocated to a storage workload in the order of the allocation list. The gap values and list are then updated.

In one aspect of the invention, a method is provided for storage volume allocation. Each storage volume in a plurality of storage volumes is associated with a first specific time period during which each individual storage volume can be accessed. A first gap value is determined for each node of a global resource tree of a storage system for the first specific time period. The first gap is then employed to determine a second gap value of an amount of storage of a new workload that can be stored in a subtree of the global resource tree for the first specific time period. The second gap cannot exceed performance boundaries at any of the nodes in the subtree. An ordered allocation list of volumes is generated on the leaf nodes of the global resource tree of the storage system. The allocation list is based on ordering the leaf nodes by the second gap value for each of the leaf nodes. The second gap value for each node corresponds to an estimate of a new workload amount that can be allocated in at least one subtree without exceeding performance and space limits of any of the subtree nodes for the first time period.

In another aspect of the invention, an article is provided with computer program instructions embodied on a computer readable medium to allocate storage volumes in a storage system represented as a resource tree. Instructions are provided to associate each storage volume among a plurality of storage volumes with a first specific time period during which each individual storage volume can be accessed. In addition, instructions are provided to determine a first gap value for each node of a global resource tree for a storage system for the first specific time period. The first gap is used to determine a second gap value of an amount of storage of a new workload that can be stored in a subtree of the global resource tree for the first specific time period, without exceeding performance boundaries at any of the nodes in the subtree. An ordered allocation list of volumes on a plurality of leaf nodes of the global resource tree of the storage system is generated based on an ordering of the leaf nodes by the determined second gap value for each of the leaf nodes. The second gap value for each node corresponds to an estimate of a new workload amount that can be allocated in one or more subtree nodes of the global resource tree without exceeding performance and space limits of any of the subtree nodes for the first specific time period.

In yet another aspect of the invention, a storage system is provided with a hierarchy of interconnected storage components represented as a global resource tree. The tree includes nodes corresponding to the different interconnected storage components for the storage system. A processor is provided to determine a first gap value for each node of the global resource tree for a first specific time period during which the individual storage volume associated with the node can be accessed, and employs the first gap value to determine a second gap value of an amount of storage of a new workload that can be stored in a subtree of the global resource tree for the first specific time period, without exceeding performance boundaries at any of the nodes in the subtree. The process to generate an ordered allocation list of volumes on a plurality of leaf nodes of the global resource tree is based on ordering the leaf nodes by the second gap value for each of the leaf nodes, and the second gap value for each node corresponds to an estimate of a new workload amount that can be allocated to one or more subtree nodes of the global resource tree without exceeding performance and space limits of any of the subtree nodes for the first specific time period.

Other features and advantages of this invention will become apparent from the following detailed description of the presently preferred embodiment of the invention, taken in conjunction with the accompanying drawings.

BRIEF DESCRIPTION OF THE SEVERAL VIEW OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DETAILED DESCRIPTION

Figure 1:
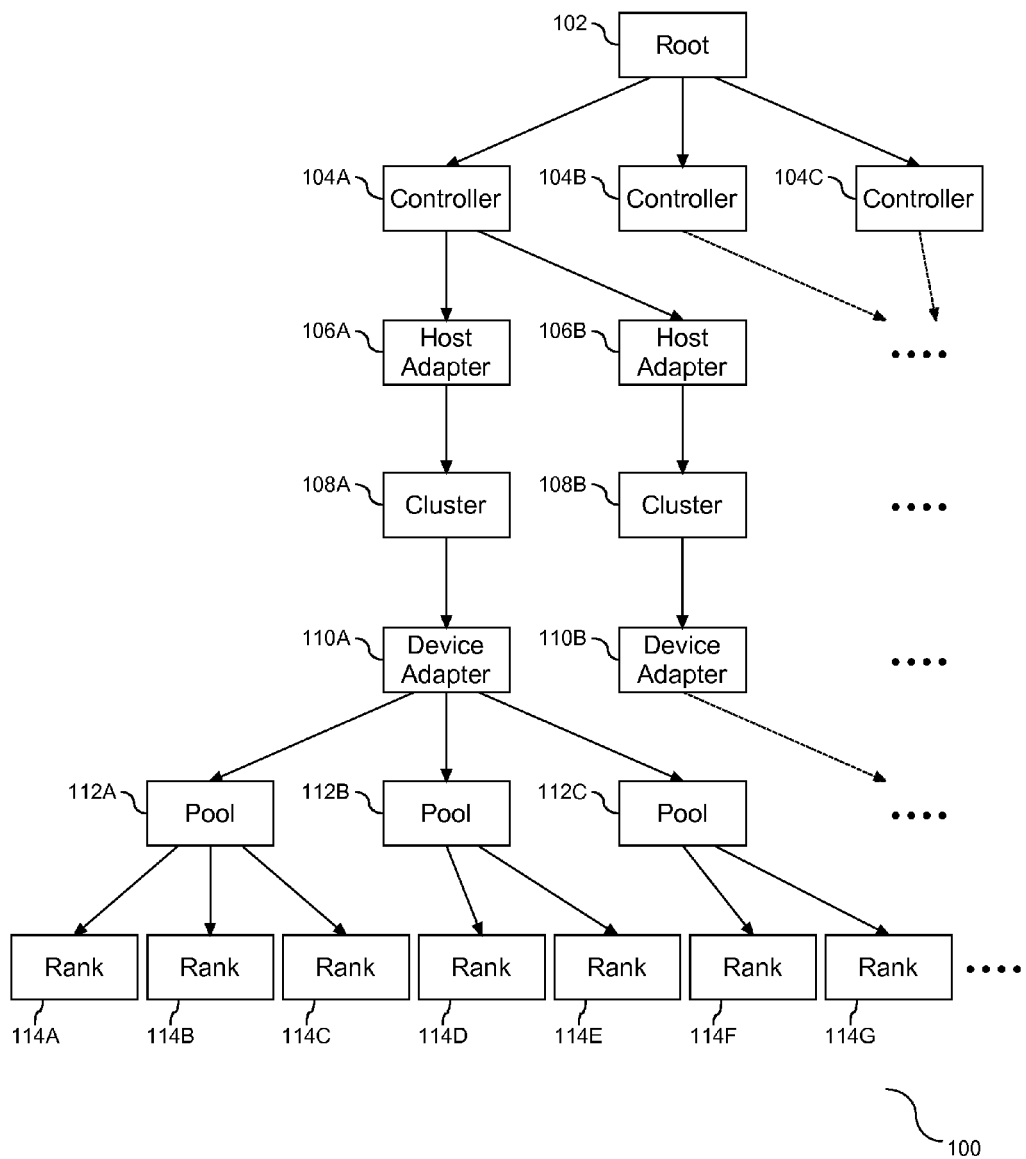
FIG. 1 illustrates an exemplary global resource graph visually representing a tree style hierarchy of the dependencies between various interconnected hardware elements of a storage system.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Functional units have been described in this specification. These units may be implemented in programmable hardware devices such as field programmable gate arrays, programmable array logic, programmable logic devices, or the like. The units may also be implemented in software for execution by various types of processors. An identified unit of executable code may, for instance, comprise one or more physical or logical blocks of computer instructions which may, for instance, be organized as an object, procedure, function, or other construct. Nevertheless, the executables of an identified unit need not be physically located together, but may comprise disparate instructions stored in different locations which, when joined logically together, comprise the unit and achieve the stated purpose of the unit.

Indeed, a unit of executable code could be a single instruction, or many instructions, and may even be distributed over several different code segments, among different applications, and across several memory devices. Similarly, operational data may be identified and illustrated herein within the unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, for a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

Placement of additional or increased workloads on storage controllers demands careful consideration of factors, such as available space and performance of the various components of the storage controller collection based on current workload. Current algorithms can prove to be inadequate in appropriately balancing the performance of the various components for a large storage controller collection. A new algorithm is provided for provisioning workload volumes on a plurality of storage controllers, taking into consideration the space and performance loads on the various components of the controllers and time periods for access to the components. Experimentation indicates that the new algorithm can outperform existing algorithms in terms of balancing the load across various components of a storage controller collection for time-based storage access services, resulting in cost saving for allocating volumes of data. The method when compared to the random and state of the art methods yields lower variances across system components at different levels of the resource graph hierarchy, which is a measure of better quality. The new algorithm utilizes the hierarchical structure together with costs factors to solve the resource volume allocation problem based upon the economic principles of supply and demand. In one embodiment, a component represented as a node may be powered down during a specified time period to save power when it is determined that the component is not needed during the specified time period. On average, the algorithm can improve incremental power consumption by a factor of two over previous state of the art methods. Thus, the method can provide improved power consumption for performance based volume allocation with better quality.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the spirit and scope of the present invention.

The description may disclose several preferred embodiments to allocating storage volumes based upon time availability. While the following description will be described in terms of time sensitivity, it should be kept in mind that the teachings herein may have broad application to all types of systems, devices, and applications.

In one embodiment of the invention, storage volume allocation is determined based upon time availability and storage access patterns. There are many examples of storage access patterns that are time-based, including the following examples:

1. Personal multimedia: photos, music, video: Could be less expensive during evenings and weekend hours.
2. Small business: Data needed during open hours only;
3. Backups/replications: Most happen at off-peak hours (nightly);
4. Data mining: Can be done whenever it is less expensive to do so;
5. Data consistency checking: e.g., Banks can do this after close of business;

FIG. 1 illustrates an exemplary global resource graph (100), which visually represents a tree style hierarchy of the dependencies between the various interconnected hardware elements of a storage system. The node at the top of the global resource graph (100) tree structure is the root node (102), which has all of the controllers for the various storage components (104A), (104B) and (104C), connected to it. The root node (102) is the central access point for all data into and out of the storage system represented by the global resource graph (100). The storage controllers (104A), (104B) and (104C) and the subtrees beneath each of them may be referred to as the controller resource graphs. Note that in the example only one complete branch of the global resource graph (100) is shown to the leaf nodes (ranks) at the bottom. It should also be noted that a leaf node (rank) may comprise one or more of the volumes to be allocated by the algorithm. The combination of the controller resource graphs under the common root node (102) form the global resource graph (100). In the example, the storage controller (104A) is communicatively coupled to host adapters (105A) and (105B), which connect the host system to the storage devices. The host adapter (105A) is connected to the cluster (106A), which provides management of the storage system. The cluster (106A) is connected with the device adapter (107A), which provides communication between the cluster (106A) and the storage devices (110A)-(110G). The storage pools (108A), (108B) and (108C), identify which of the volumes, or storage and (110A)-(110G) should be managed by the controllers. It should be noted that the global resource graph (100) depicted is only an example. Different storage systems will be represented by different graphs as will be understood by those skilled in the art. For example, other systems may couple controllers to different numbers of host adapters, and/or device adapters may oversee different numbers of storage pools in the leaf nodes in a lower tier of the storage hierarchy, depending upon the particular storage system architecture. Accordingly, different architectures having different component layers may also be implemented with embodiments of the invention.

Embodiments of the invention may operate using two important processes, a bottom-up estimation process and a top-down selection process. The bottom-up estimation process is driven by the compilation of a global resource graph from the controller resource graphs used with the performance numbers from storage components. This construction of the global resource graph from controller resource graphs is also why the estimation process may be characterized as being bottom-up. Bottom-up constructions are those where smaller, more specific pieces of information are constructed together to form a larger picture of the system. This process is used to determine if all the child nodes can support as much load as the parent node. If the sum of the loads that all the child nodes can support is less than that which the parent node can support, the estimate for the parent node needs to be reduced to the estimate of the sum of the loads that its child nodes can support. The top-down selection process is based on the analysis of the bottom-up estimation. It is referred to as "top-down" because the algorithm traverses each level of the global resource graph and volumes are allocated in the last, most specific node of the graph.

Figure 2A:
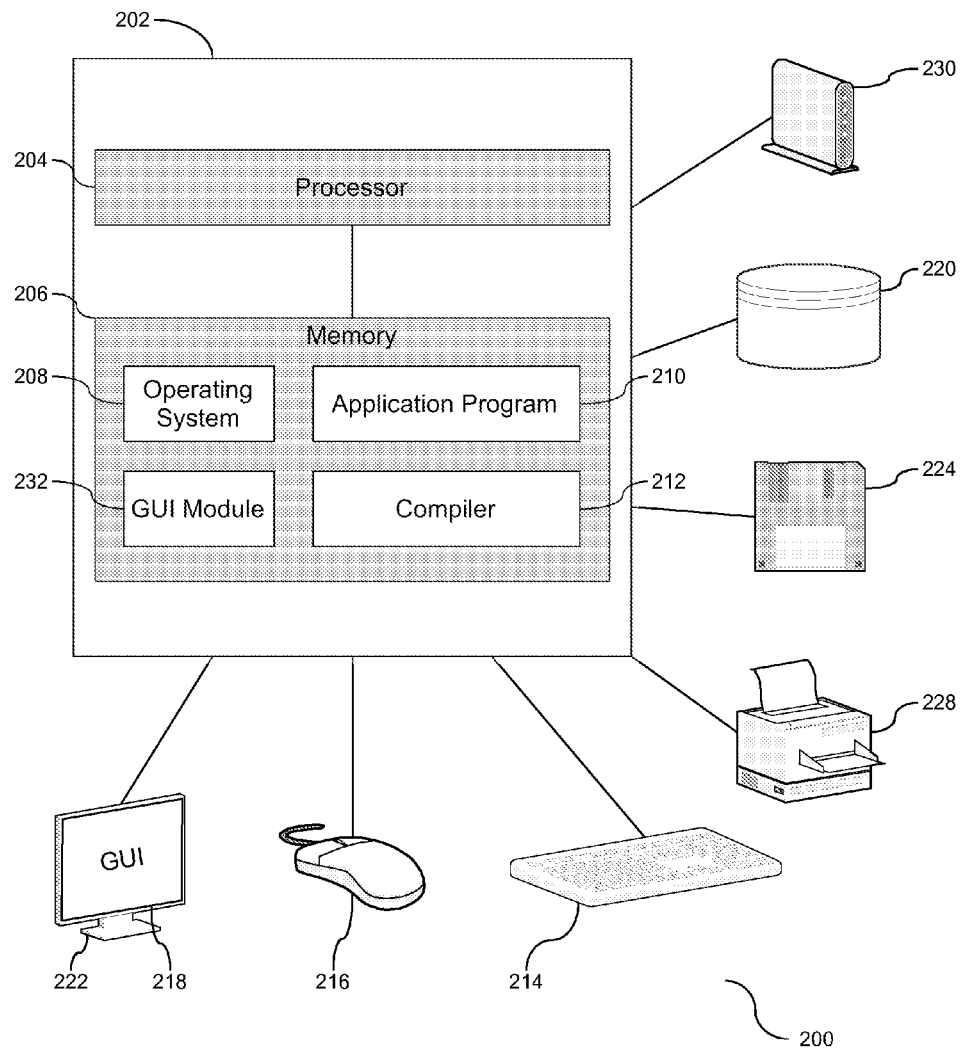
FIG. 2A illustrates an exemplary computer system that can be used to implement embodiments of the present invention.

FIG. 2A illustrates an exemplary computer system (200) that can be used to implement embodiments of the present invention. The computer (202) comprises a processor unit (204) and memory (206), such as random access memory (RAM). The computer (202) is operatively coupled to a display (222), which presents images such as windows to the user on a graphical user interface (218). The computer (202) may be coupled to other devices, such as a keyboard (214), a mouse device (216), a printer (228), etc. Of course, those skilled in the art will recognize that any combination of the above components, or any number of different components, peripherals, and/or other devices, may be used with the computer (202).

Generally, the computer (202) operates under control of an operating system (208) (e.g. z/OS, OS/2, LINUX, UNIX, WINDOWS, MAC OS) stored in the memory (206), and interfaces with the user to accept inputs and commands and to present results, for example through a graphical user interface (GUI) module (232). Although the GUI module (232) is depicted as a separate module, the instructions performing the GUI functions can be resident or distributed in the operating system (208), a computer program (210), or implemented with special purpose memory and processors.

The computer (202) also implements a compiler (212) which allows one or more application programs (210) written in a programming language such as COBOL, PL/1, C, C++, JAVA, ADA, BASIC, VISUAL BASIC or any other programming language to be translated into code that is readable by the processor (204). After completion, the computer program (210) accesses and manipulates data stored in the memory (206) of the computer (202) using the relationships and logic generated using the compiler (212). The computer (202) also optionally comprises an external data communication device (230) such as a modem, satellite link, ethernet card, wireless link or other device for communicating with other computers, e.g. via the Internet or other network.

Instructions implementing the operating system (208), the computer program (210), and the compiler (212) may be tangibly embodied in a computer-readable medium, e.g., data storage device (220), which may include one or more fixed or removable data storage devices, such as a zip drive, floppy disc (224), hard drive, DVD/CD-ROM, digital tape, etc., which are generically represented as the floppy disc (224). Further, the operating system (208) and the computer program (210) comprise instructions which, when read and executed by the computer (202), cause the computer (202) to perform the steps necessary to implement and/or use the present invention. Computer program (210) and/or operating system (208) instructions may also be tangibly embodied in the memory (206) and/or transmitted through or accessed by the data communication device (230). As such, the terms "article of manufacture," "program storage device" and "computer program product" as may be used herein are intended to encompass a computer program accessible and/or operable from any computer readable device or media.

Embodiments of the present invention are generally directed to a software application program (210) that manages data objects, i.e., files, access to a storage system comprised of multiple separate storage devices. The program (210) may operate within a single computer (202) or as part of a distributed computer system comprising a network of computing and storage devices. The network may encompass one or more computer/storage devices connected via a local area network and/or Internet connection (which may be public or secure, e.g. through a VPN connection).

Figure 2B:
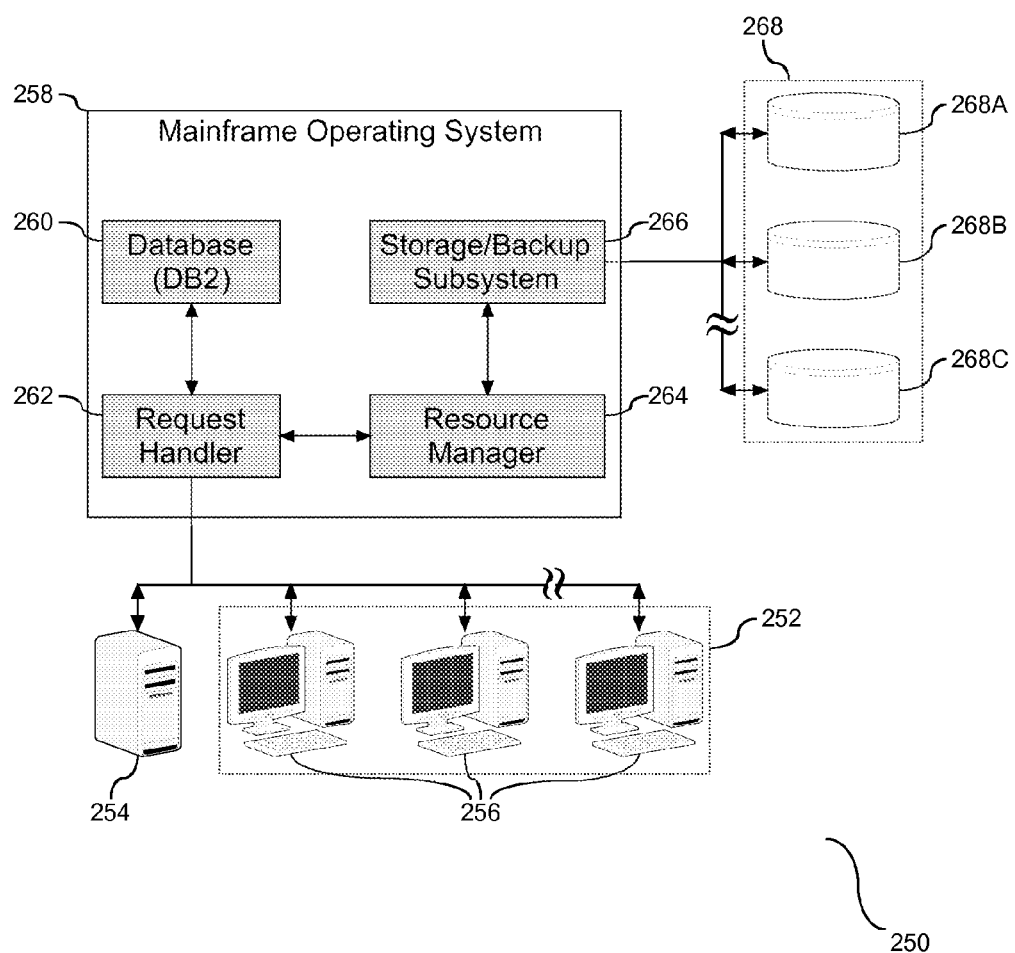
FIG. 2B illustrates a typical distributed computer system which may be employed in a typical embodiment of the invention.

FIG. 2B illustrates a typical distributed computer system (250) which may be employed with a typical embodiment of the invention. Such a system (250) comprises a plurality of computers (202) which are interconnected through respective communication devices (230) in a network (252). The network (252) may be entirely private (such as a local area network within a business facility), or part or all of the network (252) may exist publicly (such as through a virtual private network (VPN) operating on the Internet). Further, one or more of the computers (202) may be specially designed to function as a server or host (254) facilitating a variety of services provided to the remaining client computers (256). In one example, one or more hosts may be a mainframe computer (258) where significant processing for the client computers (256) may be performed. The mainframe computer (258) may comprise a database (260) which is coupled to a request handler (262) which implements a number of database procedures for other networked computers (202) (servers (254) and/or clients (256)). The request handler (262) is also coupled to a resource manager (264) which directs data accesses through storage/backup subsystem (266) that facilitates accesses to networked storage devices (268) comprising a SAN. Thus, the storage/backup subsystem (266) on the computer (258) comprises the backup server which manages backup data objects from the client computers (256) stored on networked storage devices (268) in a distributed storage system. The SAN may include devices such as direct access storage devices (DASD) optical storage and/or tape storage indicated as distinct physical storage devices (268A)-(268C). Various known access methods (e.g. VSAM, BSAM, QSAM) may function as part of the storage/backup subsystem (266).

Figure 2C:
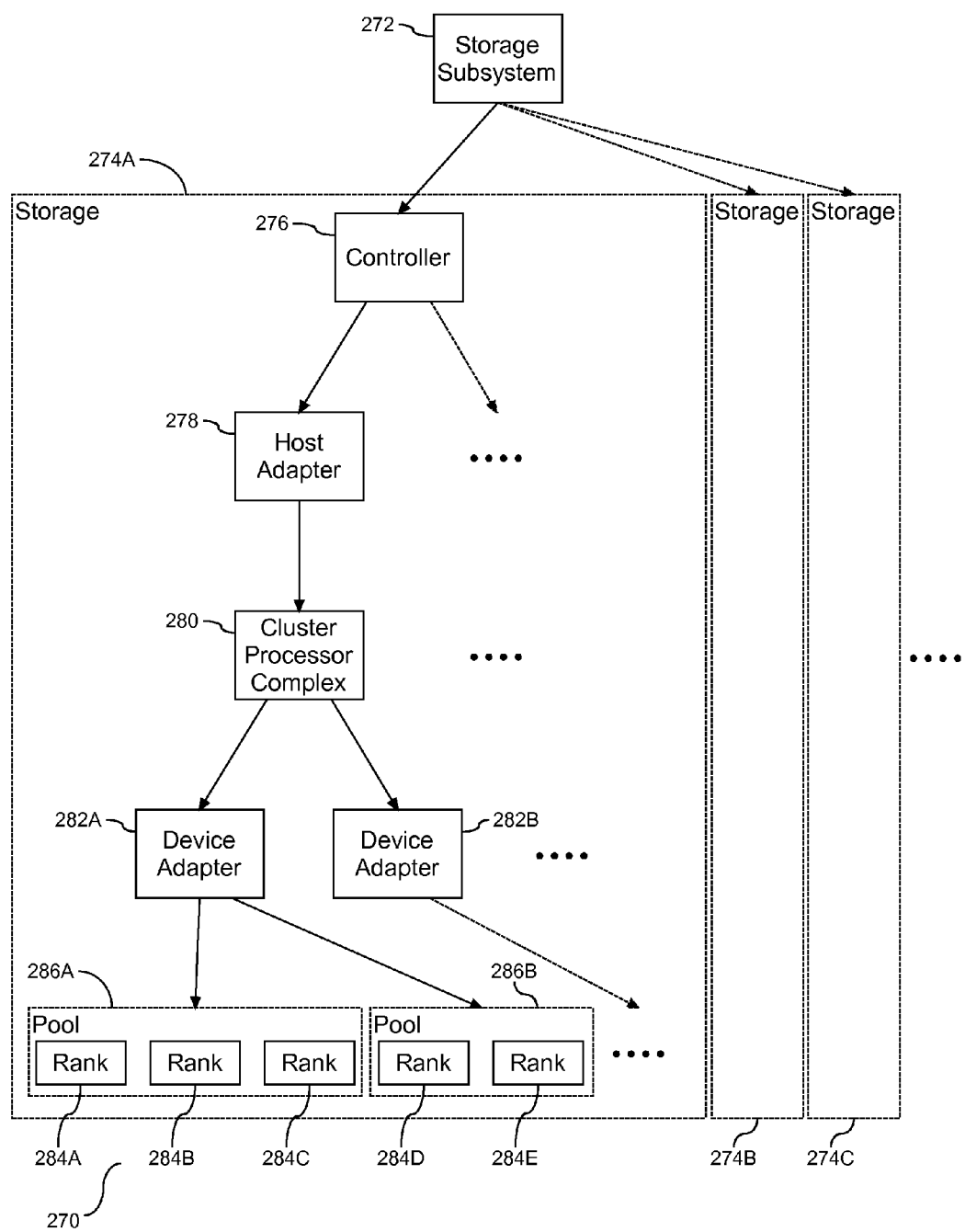
FIG. 2C illustrates a typical storage system implementing an embodiment of the invention.

FIG. 2C illustrates a typical storage system (270) implementing an embodiment of the invention. For example, the storage system (270) may operate as part of the storage/backup subsystem (266) and storage devices (268) in the distributed computer system (250) of FIG. 2B. A typical implementation of the invention comprises a program operating on the storage subsystem (272), e.g., the storage/backup subsystem (266) of the computer (258) of FIG. 2B. The storage subsystem (272) is coupled to a plurality of storage devices (274A)-(274C). Although only one storage device (247A) will be described in detail, it should be understood that other storage devices (274B), (274C) may be similarly constituted. The controller (276) directs where data goes within the storage device (274A). The data is at least part of a storage workload coming through the storage subsystem (272). Typically, one or more host adapters (278) operate as the external interface to the system coupled to the cluster processor complex (280), which handles inputs and outputs coming from the one or more host adapters (278). The cluster processor complex (280) is connected to device adapters (282A) and (282B), which connect the ranks (284A)-(284E) to the system that controls them. The ranks (284A)-(284E) comprise the physical disks where the data is physically stored in the storage device (274A) and which are accessed through one or more device adapters (282A), (282B) coupled to the cluster processor complex (280). The ranks (284A)-(284E) may be organized into one or more pools (286A), (286B) under a given device adapter (282A). The described hardware architecture is only an example; those skilled in the art will understand that any number of different devices, e.g., controllers, host adapters, cluster processors, device adapters and physical disks comprising data volumes, may be coupled together in alternate architectures within the scope of the invention.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

A typical embodiment of the invention may be characterized as a programmed algorithm which operates to direct the storage of a data workload into the various volumes of a storage system while accounting for anticipated workload of the volumes at specific time periods. This is referred to herein as time-based storage access services. The algorithm requires a workload profile, including certain performance measurements of each node at specific time periods as input information, and generates a list of the volumes ranking the order that they should be applied to the workload as output information. For example, the inputs to the algorithm may comprise a workload profile and controller resource graphs, showing performance measures, e.g. throughput rates, for each node of the controller.

The workload profile can include information such as the total workload size to be stored, e.g., in gigabytes (GB), and a nominal cost value at each node. The nominal cost value is a measure of the increase in performance utilization experienced at a node per GB of the workload on any pool associated with the particular node. Any node is associated with all its descendant pools in the resource graph hierarchy.

The controller resource graphs describe the structure of the different storage controllers in the storage system. This structure may vary for different controllers depending on the controller design. Different controllers have different numbers of components in the described hierarchy, or any alternate hierarchy. The particular performance numbers (e.g., the 100% utilization throughput rates) for different components of the system are also provided as an input to the algorithm.

In addition, a maximum and minimum permissible logical volume size may be identified. The maximum and minimum volume size constraint maybe as determined by the system administrator or through some other constraints applied in the system. It is probably not feasible to employ very small or very large volume sizes; small volume sizes may lead to excessive fragmentation and large volume sizes may result in imbalance in the system.

Figure 3:
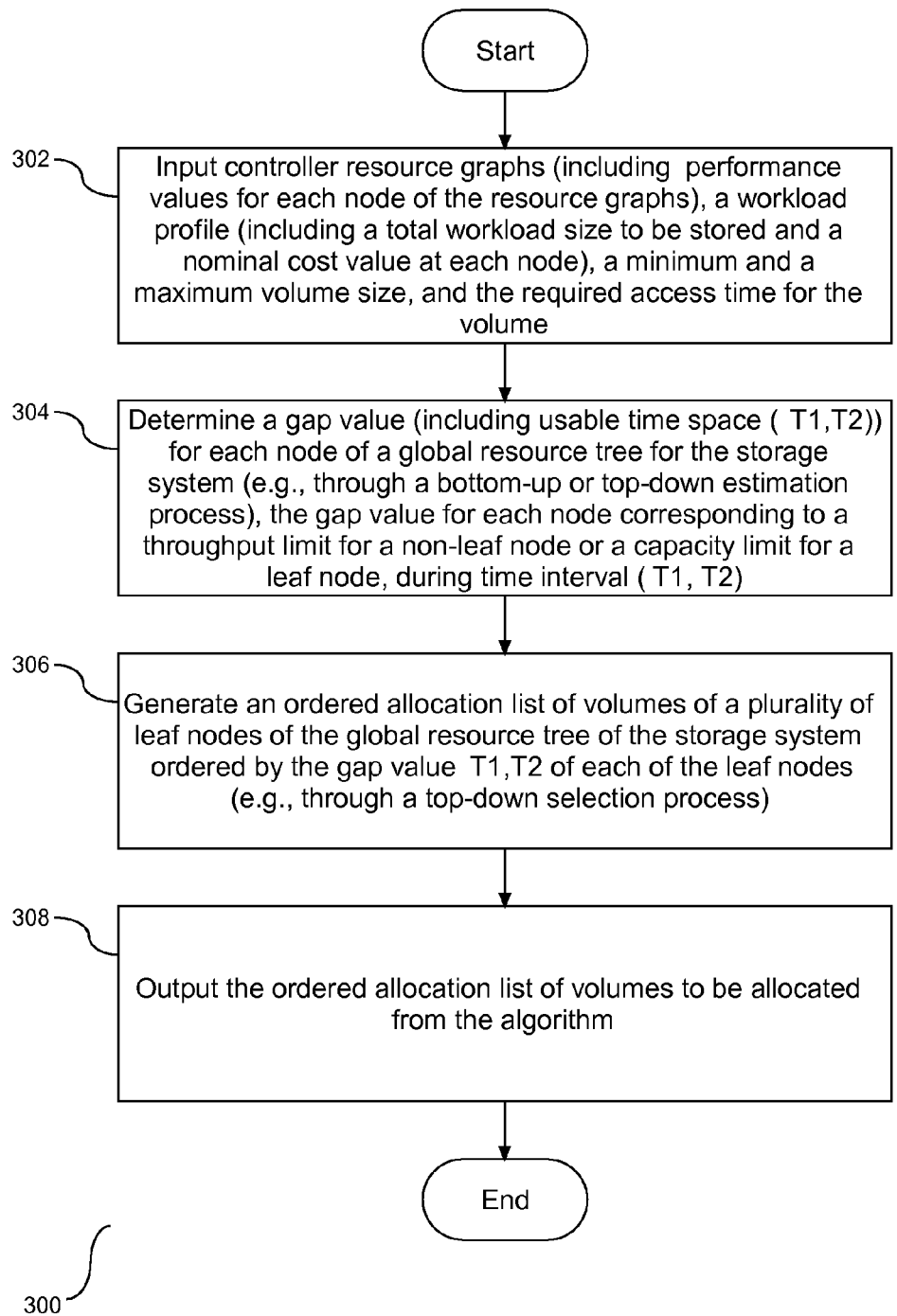
FIG. 3 is a flowchart of exemplary steps of a volume allocation algorithm embodiment of the invention.

FIG. 3 is a flowchart of exemplary steps of a volume allocation algorithm (300) embodiment of the invention. The algorithm (300) may be initiated in step (302) with an input of controller resource graphs, including performance values for each node of the resource graphs, a workload profile, including a total workload size to be stored and a nominal cost value at each node, a minimum and a maximum volume size, and the required time period for availability of the volume. In step (304) a gap value, including a useable time space (T1, T2), for each node of a global resource tree is determined for the storage system. In one embodiment, a bottom-up estimation process is employed at step (304). However, the invention should not be limited to this embodiment, as in another embodiment a top-down estimation process may be employed. The gap value, including the useable time space, for each node corresponds to an estimate of a new workload amount that can be allocated in one or more subtree nodes of the node at a specified time space without exceeding performance and space limits of any of the subtree nodes of the node. Next in step (306), an ordered allocation list of volumes on a plurality of leaf nodes of the global resource tree of the storage system is generated based on ordering the leaf nodes by the gap value for each of the leaf nodes, through a top-down or bottom-up selection process. Finally, in step (308) the ordered allocation list of volumes to be allocated may be output from the algorithm (300).

As described, embodiments of the invention can be implemented as an algorithm for scalable volume provisioning of new workloads on storage controller collections. A better balanced allocation can result without falling for the weaknesses associated with the other conventional storage allocation algorithms. Pseudo code for an example algorithm, which may be referenced as a Scalable Performance-based Volume Allocation (SPVA) algorithm, is provided here.

Input: Controller resource graphs; performance numbers at nodes
Input: Workload profile including Nominal Cost, Required Space, and useable time space (T1, T2) at each node;
    MinVolumeSize; MaxVolumeSize
Output: Ordered List of Volumes for allocation -continued Begin
1. Construct a global resource graph with controller graphs as sub trees and a single root node
2. For each node v
Compute local TargetSpaceGap(v, T1, T2) or lgap(v, T1, T2)
/* Any black-box node-specific calculation can be used */
3. Do a post-order traversal of the graph:
compute childSum(v, T1, T2) = sum gap(u, T1, T2) over all children u of v
compute gap(v, T1, T2) = min{lgap(v, T1, T2), childSum(v, T1, T2)};
if (gap(v, T1, T2) < minVolumeSize) set gap(v, T1, T2) =0;
4. allocatedSpace = 0; allocList = { };
5. while (allocatedSpace < RequiredSpace &&
gap(root, T1, T2) > RequiredSpace – allocatedSpace) do {
v = root; found = false;
6.     while (!found && gap(v, T1, T2) >= 0) do {
if (v is a leaf node)
L = min(ReqSpace-allocatedSpace, gap(v, T1, T2));
7.         L' = (L > MaxVSize) ? MaxVSize : ((L<MinVSize) ? MinVSize : L);
8.         Allocate a volume V of size L' on v;
allocList += V; allocatedSpace += L'; found = true;
9.         UpdateGap( ) to update gap(.) numbers at all parents and ancestors;
else
10.        Select a suitable child u of v
set v = u and recursively repeat the inner while loop
} /* inner while */
11. If (allocatedSpace < RequiredSpace) print "no allocation possible"
12. else return allocList;;
    end if;

After performing the bottom-up estimation or the top-down selection, the output of the invention is a list of volumes to be allocated. The objective of the algorithm is to provide an ordered list of volumes for allocation by distributing the workload among various components while maintaining balanced overall load across these components and consideration for the time space of each of the components. Optimized placement of data into the pools can lead to increased performance utilization at higher levels as well, as these higher levels also serve the data in the storage system. The bottom-up estimation and top-down selection processes of the foregoing example algorithm (300) will be further described in the following sections.

Figure 4:
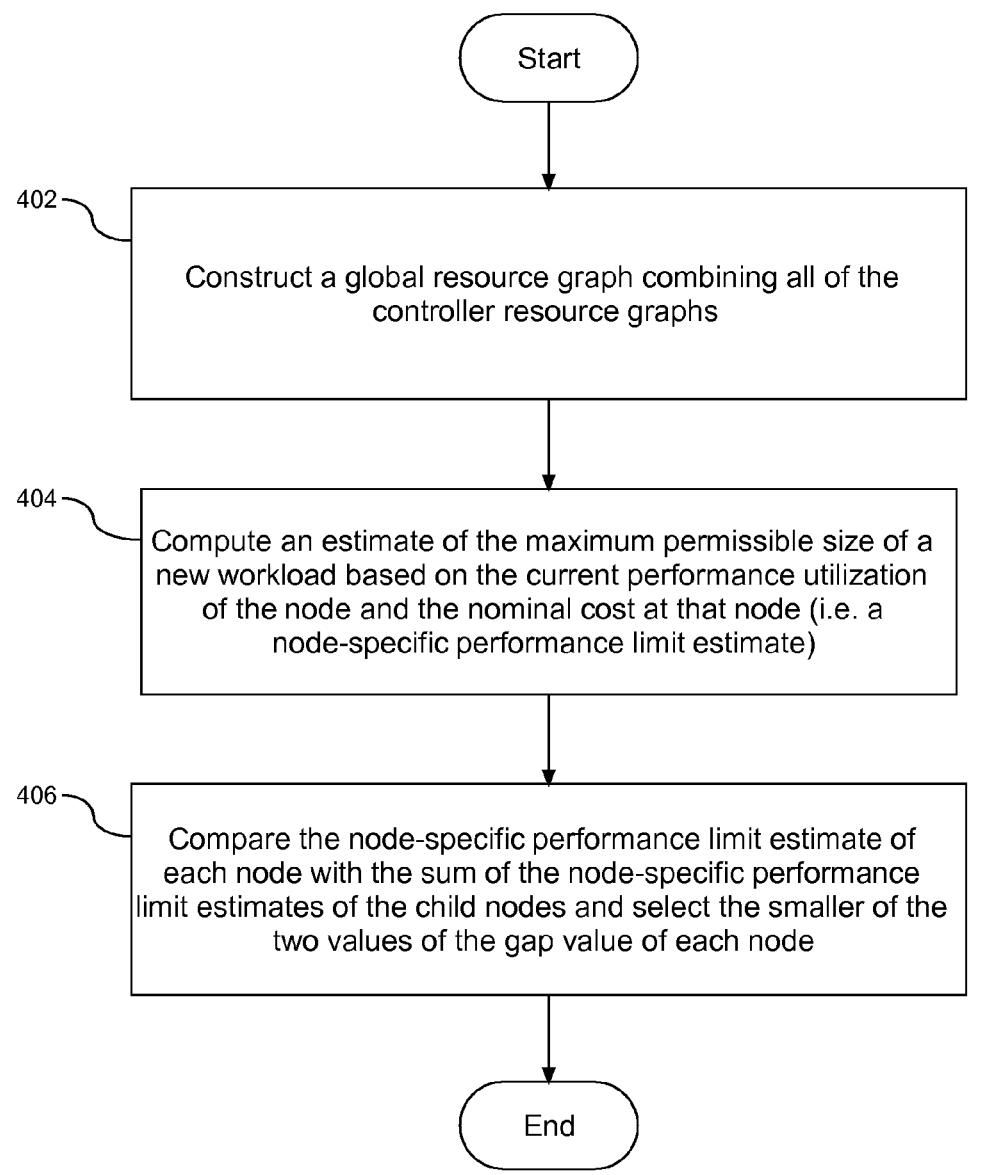
FIG. 4 is a flowchart of an example bottom-up estimation process.

FIG. 4 illustrates the bottom-up estimation process algorithm (400), which begins in step (402) with construction of a global resource graph by combining all of the controller resource graphs, which are given as inputs, under a single root node. This construction of a global resource graph permits a view of the entire storage system as a tree shaped structure with the resource graphs for different storage controllers as sub-trees. The algorithm operates on this global resource graph. In a tree shaped structure for displaying a hierarchy, the top of the tree is referred to as the "root" node, nodes stemming from a single node are referred to as the "children" of the single "parent" node, and at the bottom of the tree, the last nodes that have no child nodes are referred to as "leaf" nodes.

After the global resource graph is created, in step (404) the algorithm (400) computes an estimate of the maximum permissible size of a new workload based on the current performance utilization of the node and the nominal cost at that node, i.e. a node-specific performance limit estimate. The algorithm denotes these initial node-specific performance limit estimates of all of the components represented as nodes in the graph, as the local gap, lgap(v, T1, T2), where v is the node being measured, T1 is the start time at which the node is available, and T2 is the end time at which the node becomes unavailable. In other words, the lgap is how many gigabytes of workload a certain node is capable of handling during a specific time space.

Any suitable formula to determine the lgap may be used; however, the following formula is optimal for this algorithm:

$$lgap(v, T1, T2) = \min\{FreeSpace(v, T1, T2), (100 - perfUtil(v, T1, T2))/nominalCost(v, T1, T2)\}$$

$$\text{if } (lgap(v, T1, T2) < MinVSize) lgap(v, T1, T2) = 0;$$

This formula factors in the performance utilization of the node, the nominal cost of the node, the available time space, and allows for correction of the lgap based on the minimum permissible volume size. If the calculated lgap is unable to handle even the lowest volume size at the available time space, then the value is set to zero, as it is not possible to set a volume size smaller than the minimum. These formula factors in the performance utilization of the node and the nominal cost of the node, where nominal cost represents how much percentage performance utilization will be incurred on this node if a 1 GB unit of the new workload were allocated there. The nominal cost can differ for disk adapters, clusters, ranks, etc., depending on the relative IO throughput and bandwidth transfer going through those nodes. If the calculated lgap is insufficient to handle even the lowest volume size, then the value is set to zero, as it is not possible to set a volume size smaller than the minimum.

Once the lgap values are determined, a smoothing of the values can occur in step (406). The algorithm (400) can perform a post-order traversal for each node, comparing the lgap value of each node with the sum of the lgap values of the child nodes. The smaller of the two values is chosen, and is now referred to as the gap value of the node. For each node v in the resource graph, gap (v, T1, T2) is the amount in GB of new workload that can be put in a sub tree of v and time space T1, T2, without exceeding performance or space bounds at any of the nodes in the subtree of v. By this logic, the gap value of the root node of the global resource graph must be a good estimate of the total workload (in GB) that can be served in the system.

The post-order traversal comprises a systematic approach in which a tree structure can be processed, ensuring that all of the nodes are analyzed. The traversal starts at the root node of the tree and checks to see if the left node is a null value. If it is a null value, the right node is checked to see if it is a null value. If all children are null, the node is then visited. If the left child is not null, post-order traversal is performed on the left node. Similarly, if the right node is not null, post-order traversal is performed on it as well. In all cases of post-order traversal, the left node is always checked first. In general, the sequence of operations in a post-order traversal is: left, right, visit—apply the traversal to the left node, apply traversal to the right node, and when those are completed, visit the current node.

Figure 5:
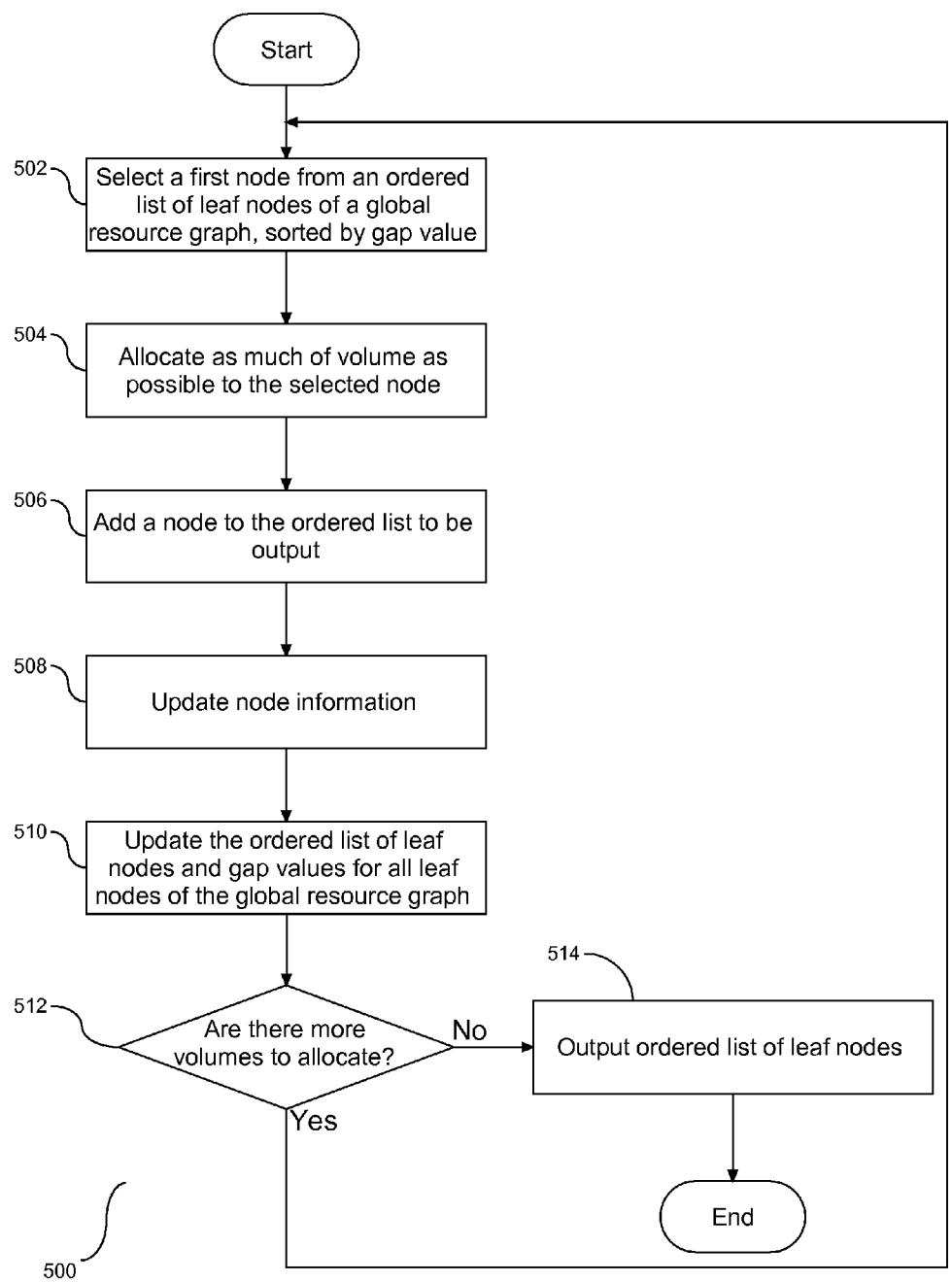
FIG. 5 is a flowchart of an example top-down selection process.

FIG. 5 illustrates a process that represents the top-down selection portion of an exemplary embodiment of the invention. The top-down selection algorithm (500) can begin in step (502) with a selection of the first node from an ordered list of leaf nodes, e.g., generated by the bottom-up estimation algorithm (400) of FIG. 4. This first node is the node with the highest gap value, able to handle the most workload. Once this node is selected, the algorithm (500) determines how much of the volume can be allocated to the leaf node. The gap value must be greater than the minimum permissible volume size and smaller than the maximum permissible volume size. If this is the case, in step (504) the algorithm allocates as much of the volume as possible to the selected node. In step (506), the volume to be allocated is added to the ordered list, which becomes the output of the algorithm. The variable keeping track of how much has been allocated so far is updated and the gap values for all nodes are updated as well (510). During this updating of the gap values, the list that keeps the nodes in a sorted order is also updated to reflect the gap values after allocation.

The overall algorithm performs this top-down selection recursively until there is either no more workload to be allocated, or until there are no more places to allocate them to (512). As mentioned previously, at the end of the process, the output of the algorithm is a list of volumes to be allocated (514).

An exemplary embodiment of the invention comprising both a bottom-up estimation process and a top-down selection process may be further described as follows. Reference is made to the example pseudo code for a Scalable Performance-based Volume Allocation (SPVA) algorithm, listed in paragraph 0048. After making the initial calculations, the algorithm can begin with the allocation process and recursively attempt to find suitable volumes to be allocated. Starting at the root level of the resource graph, the algorithm can traverse down the graph in an attempt to find a suitable child of node v recursively. It is required that the children of node v are maintained in a sorted order, ordered by decreasing gap (v, T1, T2) values. The algorithm selects the child with the highest gap (v, T1, T2) value. It should be noted that other schemes which permit user-defined cost functions or policy mechanisms, (i.e., depending on raid levels, etc.) can also be used to determine which child node to select. This process is performed recursively until the algorithm encounters a node at the leaf level of the global resource graph. In order to assign volumes at the leaf level, the algorithm determines a suitable volume size to be allocated at this leaf level. The volume size, as can be seen from the example algorithm, must be less than maximum permissible volume size and greater than minimum permissible volume size. The volume size must also be the minimum of the gap (v, T1, T2) value at the leaf node and the unallocated workload size, i.e., the Required Space less the Allocated Space.

Taking into consideration the foregoing constraints, the algorithm allocates a volume of size L', e.g., as in step 8 of the example algorithm, on this leaf node, i.e., at the pool level. The allocated volume is then added to the ordered allocation list and the total allocated space is incremented by the size of the allocated volume. Note that the feasibility of this allocation is guaranteed by the calculations involved. The next step (e.g., step 9 of the example algorithm) involves updating of the gap(v, T1, T2) values. This may be accomplished using an UpdateGap( ) function (described below) after each successful allocation. The size of the allotted volume is used to recalculate the gap (v, T1, T2) values for each ancestor of the leaf node v selected in Step 6.

For each ancestor u of leaf node v, the example algorithm decrements the lgap value by the size of allocated volume (L'). The childSum of u is also decremented by the same value and newval is calculated as the minimum of lgap(u) and childSum(u). The example algorithm ensures that newval is not less than the minimum volume size (else it is set to zero) and assigns the value of newval as the new gap (u) value. The value of decrement is revised as a decrement equal to the gap(u) less newval for calculations at the higher level. The process is iteratively repeated until the updating has been performed at the root level. All gap values are successfully updated using this function. In order to maintain the ordering of nodes according to gap( ) values the UpdateGap( ) function below must perform appropriate reinsertions.

```
Function UpdateGap (T1, T2)
decrement = L';
for successive ancestors u of v do {
        lgap(u, T1, T2) = lgap(u, T1, T2)–L';
        childSum(u, T1, T2) = childSum(u, T1, T2) – decrement;
            newval = min(lgap(u, T1, T2), childSum(u, T1,
    T2));
        if (newval < MinVSize) newval = 0;
        decrement = gap(u, T1, T2) – newval;
        gap(u, T1, T2) = newval;
} /* repeat with parent(v)*/
```

The algorithm then repeats steps 5-10 until either it has allocated the required space or the algorithm determines that no new suitable volume can be allocated on the system.

Additionally, the user has the option of specifying the order for organizing the nodes. The default, as described in the specification so far, is for the algorithm to sort the nodes by decreasing gap values. However, if the user wishes to order them in some other manner, the order can be adjusted. The assumption in the pseudocode is that the values will be ordered according to decreasing gap values.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

It will be appreciated that, although specific embodiments of the invention have been described herein for purposes of illustration, various modifications may be made without departing from the spirit and scope of the invention. In particular, a workload is not limited to an increased workload. In one embodiment, the workload may be reduced and the gap value may be ascertained for the reduced workload at any of the nodes in a subtree for a specific time period. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims. Accordingly, the scope of protection of this invention is limited only by the following claims and their equivalents.

We claim:

1. A method of storage volume allocation, comprising:
   providing a global resource tree having nodes representing resources within a storage system;
   associating a first specific time period for availability of a node in the global resource tree to allocate a new workload with the size of the new workload;
   determining a first gap value for each node of the global resource tree for the first specific time period, the first gap identifying a size of a workload each node is able to accept during the first specific period of time;
   employing the first gap value to determine a second gap value of an amount of storage of a new workload that can be stored in a subtree of the global resource tree for the first specific time period, without exceeding a performance limit at any of the nodes in the subtree, the performance limit being a storage space available during a specific time period; generating an ordered allocation list of volumes on a plurality of leaf nodes of the global resource tree of the storage system based on ordering the leaf nodes by the determined second gap value for each of the leaf nodes;
   selecting one of the nodes of the global resource tree for allocation of a new workload based upon the generated allocation list and a required time period for availability of a volume; and
   wherein the second gap value for each node corresponds to an estimate of a new workload amount that can be allocated in one or more subtree nodes of the global resource tree without exceeding the performance limit of any of the subtree nodes for the first specific time period.

2. The method of claim 1, further comprising allocating the new workload to a select child node, wherein a performance of any of the nodes on a path from the child node to the root node does not exceed the performance limit for the first specific time period.

3. The method of claim 2, further comprising reordering the allocation list of volumes following allocation of the workload.

4. The method of claim 2, further comprising updating the determined gap value for each node of the global resource tree following allocation of the workload.

5. The method of claim 1, further comprising associating each storage volume in a plurality of storage volumes with a second specific time period during which each individual storage volume can be accessed and determining the first and second gap values for the second specific time period, the second specific time period different from the first specific time period.

6. The method of claim 1, further comprising specifying a third time period during which access to the storage volume is desired, and allocating the new workload within the subtree rooted to a select leaf node at the specified third time period, wherein the selection excludes any of the nodes on a path from the leaf node to the root node exceeding a performance limit for the first specific time period.

7. The method of claim 1, further comprising removing power from any of the nodes in the global resource tree that are not selected for utilization during a defined time period.

8. An article comprising a computer program embodied on a computer readable non-transitory data storage device to allocate storage volumes in a storage system represented as a resource tree having one or more nodes, the computer program including instructions, the instructions comprising:
   instructions to associate a first specific time period for availability of a node to allocate a new workload with the size of the new workload;
   instructions to determine a first gap value for each node of the global resource tree for a storage system for the first specific time period;

instructions to employ the first gap value to determine a second gap value of an amount of storage of a new workload that can be stored in a subtree of the global resource tree for the first specific time period, without exceeding a performance limit at any of the nodes in the subtree, the performance limit being a storage space available during a specific time period;

instructions to create an ordered allocation list of volumes on a plurality of leaf nodes of the global resource tree of the storage system generated based on ordering the leaf nodes by the determined second gap value for each of the leaf nodes;

instructions to select one of the nodes of the global resource tree for allocation of a new workload based upon the generated allocation list and a required time period for availability of a volume; and wherein the second gap value for each node corresponds to an estimate of a new workload amount that can be allocated in one or more subtree nodes of the global resource tree without exceeding the performance limit of any of the subtree nodes for the first specific time period.

9. The article of claim 8, further comprising instructions to allocate the new workload to a select child node, wherein a performance of any of the nodes on a path from the child node to the root node does not exceed the performance for the first specific time period.

10. The article of claim 9, further comprising instructions to reorder the allocation list of volume following allocation of the workload.

11. The article of claim 9, further comprising instructions to update the determined gap value for each node of the global resource tree following allocation of the workload.

12. The article of claim 8, further comprising instructions to associate each storage volume in a plurality of storage volumes with a second specific time period during which each individual storage volume can be accessed and determining the first and second gap values for the second specific time period, the second specific time period different from the first specific time period.

13. The article of claim 8, further comprising instructions to specify a third time period during which access to the storage volume is desired, and allocating the new workload within the subtree rooted to a select leaf node at the specified third time period, wherein the selection excludes any of the nodes on a path from the leaf node to the root node exceeding performance and space limits at the first specific time period.

14. The article of claim 8, further comprising instructions to remove power from any of the nodes in the global resource tree that are not selected for utilization during a defined time period.

15. A storage system, comprising:

a hierarchy of interconnected physical storage components represented as a global resource tree comprising a plurality of nodes corresponding to the different interconnected storage components for the storage system;

a physical processor to associate a first specific time period for availability of a volume on a node to allocate a new workload with the size of the new workload;

the physical processor to determine a first gap value for each node of the global resource tree for a first specific time period during which the individual storage volume associated with the node can be access, and to employ the first gap value to determine a second gap value of an amount of storage of a new workload that can be stored in a subtree of the global resource tree for the first specific time period, without exceeding a performance limit at any of the nodes in the subtree, the performance limit being a storage space available during a specific time period;

the physical processor to generate an ordered allocation list of volumes on a plurality of leaf nodes of the global resource tree based on ordering the nodes by the determined second gap value for each of the leaf nodes;

a physical processor to select one of the nodes of the global resource tree for allocation of a new workload based upon the generated allocation list and a required time period for availability of a volume; and wherein the determined second gap value for each node corresponds to an estimate of a new workload amount that can be allocated in one or more subtree nodes of the global resource tree without exceeding the performance limit for the subtree nodes for the first specific time period.

16. The storage system of claim 15, further comprising an allocation of the new workload within the subtree at a selected child node, wherein a performance of any of the nodes on a path from the child node to the root node does not exceed the performance for the first specific time period.

17. The storage system of claim 16, further comprising an update of the determined gap value for each node of the global resource tree following allocation of the workload.

18. The storage system of claim 15, further comprising an association of each storage volume in a plurality of storage volumes with a second specific time period during which each individual storage volume can be accessed and determining the first and second gap values for the second specific time period, the second specific time period different from the first specific time period.

19. The storage system of claim 15, further comprising a third time period specified during which access to the storage volume is desired, and allocating the new workload within the subtree rooted to a select leaf node at the specified third time period, wherein the selection excludes any of the nodes on a path from the leaf node to the root node exceeding performance and space limits at the first specific time period.

20. The storage system of claim 15, further comprising removal of power from any of the nodes in the global resource tree that are not selected for utilization during a defined time period.

* * * * *